United States Patent [19]

Rausing

[11] 4,371,364

[45] Feb. 1, 1983

[54] METHOD FOR THE MANUFACTURE OF A PRINTED, PRE-CREASED PACKING MATERIAL WEB PROVIDED WITH OPENING INDICATION

[75] Inventor: Hans A. Rausing, Lund, Sweden

[73] Assignee: Tetra Pak International AB, Lund, Sweden

[21] Appl. No.: 188,469

[22] Filed: Sep. 18, 1980

[30] Foreign Application Priority Data

Sep. 26, 1979 [SE] Sweden ................. 7907976

[51] Int. Cl.³ .................. B31B 1/18; B31B 1/88
[52] U.S. Cl. ........................... 493/7; 493/11; 493/55; 493/148; 493/324
[58] Field of Search ............ 493/324, 325, 55, 53, 493/148, 7, 6, 11

[56] References Cited

U.S. PATENT DOCUMENTS

| | | | |
|---|---|---|---|
| 390,442 | 10/1888 | Brigham | 493/64 X |
| 2,352,652 | 7/1944 | Morton et al. | 493/148 X |
| 2,865,550 | 12/1958 | Bergstein | 493/148 X |
| 3,055,152 | 9/1962 | Williams | 493/54 X |
| 3,240,611 | 3/1966 | Williams | 493/60 X |
| 3,532,536 | 10/1970 | Noyes et al. | 493/148 X |

*Primary Examiner*—James F. Coan

[57] ABSTRACT

The invention relates to a method for the manufacture of a printed, pre-creased, plastic-coated packing material web provided with opening arrangements. The method includes providing a first wider web of paper or cardboard, whose width is a multiple of the desired packing material webs, with impressed crease line patterns and opening arrangements, whereupon the paper or cardboard web is covered with plastics. The wider web so treated is then cut into a number of partial webs, each partial web is of a width corresponding to the width of a complete crease line pattern. The partial webs are rolled up into large rolls intended for transport which in a separate printing operation are provided with text and decoration and are rolled up into magazine rolls of packing material of the desired size.

5 Claims, 2 Drawing Figures

METHOD FOR THE MANUFACTURE OF A PRINTED, PRE-CREASED PACKING MATERIAL WEB PROVIDED WITH OPENING INDICATION

BACKGROUND AND SUMMARY OF THE PRESENT INVENTION

The present invention relates to a method for the manufacture of a printed, pre-creased packing material web provided with opening indications.

In the manufacture of modern consumer packages, in particular milk packages, high-capacity packing machines are used in which a web of plastic-coated packing material is converted to a tube, in that the longitudinal edges of the web are joined to one another and are sealed together. The tube so formed is filled with contents and sealed off in narrow sealing zones situated at a distance from each other transversely to the tube formed. The tube parts, sealed in this manner and filled with contents, may be given e.g. a parallelepipedic shape by fold-forming, which is done appropriately with the help of a crease-line pattern, facilitating the folding, which is impressed beforehand onto the packing material web.

It is necessary that such consumer packages should be provided with an informative text concerning the contents. It is also the wish of the producers that the packages should be provided with a form of advertising text and trade mark, so as to ensure that the producer's product can be distinguished from other products on the market.

Since the packages are identical in their shape and design when they are manufactured in the same type of packing machines, and the volume is standarized, the packing material for their manufacture will be the same for different producers and similarly the crease-line patterns impressed onto the packing material web, the opening arrangements etc. are the same.

In order to keep the price of the packing material low, the material must be produced in a rational manner on high-capacity machines. Thus, the impression of the crease-line patterns, the plastic coating etc. will take place at high speed, and that wide paper or cardboard webs will be used. Because different producers, of e.g. milk products, who use the packages in question demand different decorations and text arrangements on the packing material it is difficult, however, to carry out a rational production of packing material, since a substitution of the printing mechanism often has to be made when the printing of a wide web comprising five or more package widths takes place simultaneously. Moreover, unreasonable large wastage arises in connection with running in and lining up of the printing.

Since the packing material, with the exception of the decoration and text printed onto the material, is the same for all producers and users of the packing system in question, it has been found that it is rational to manufacture the packing material in wide webs and provide these webs with crease-line patterns, opening indications and plastic coatings, as well as possible coverings with metal foil, whereupon the said wide webs are cut up into partial webs. Each partial web comprises a complete crease-line pattern width, which partial webs are rolled up into large magazine rolls which are suitable for transport. In this manner the main manufacture of the packing material can be concentrated onto a small number of production locations with high-capacity machines, while the printing of the decorations of the individual users or producers may take place at a number of smaller processing units, to which the large transport rolls with base material are transported. At these processing locations the printing of the partial webs can take place with the help of relatively simple and possibly relatively slow-running printing presses. The decoration of each producer or user is printed onto a packing material web of suitable width and the intended crease-line pattern and the web is rolled up into magazine rolls of a size adapted to the packing machines.

Through such a process the wastage during running in, among other things, will be considerably reduced.

BRIEF DESCRIPTION OF THE DRAWINGS

A preferred embodiment of the invention will be described in the following with reference to the enclosed schematic drawing, wherein like members bear like reference numerals and wherein.

DETAILED DESCRIPTION OF THE PREFERRED EMBODIMENT

Figure 1:
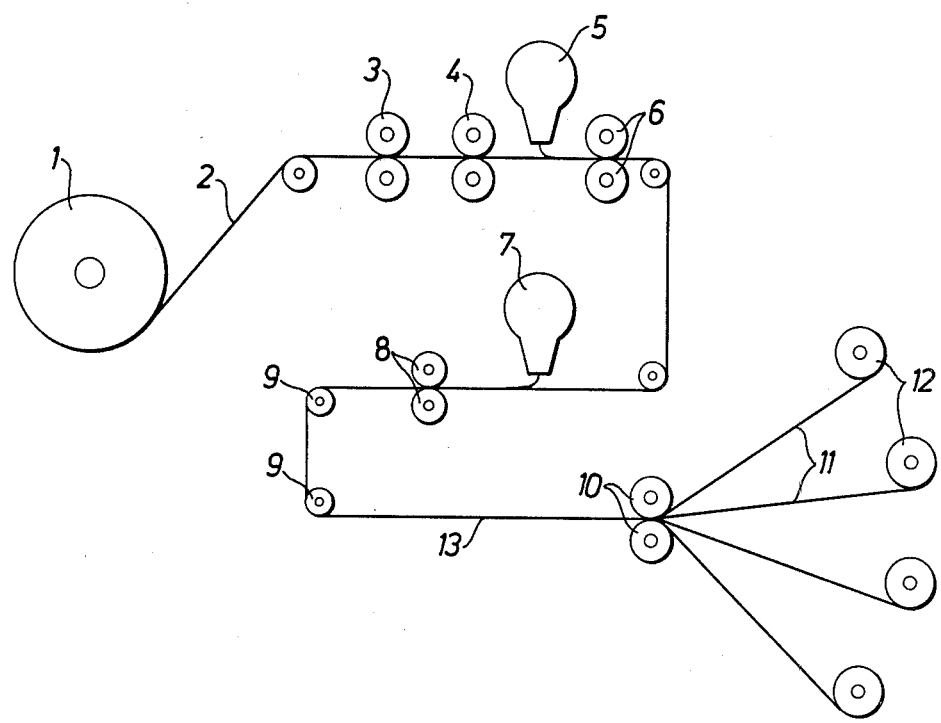
FIG. 1 is a schematic process diagram for the manufacture of the said partial webs provided with crease-line patterns and opening arrangements.

In the diagram shown in FIG. 1 a roll 1 with a "wide" first web of paper or cardboard has a web 2 rolled off the roll 1. Furthermore, a rotating device 3 impresses crease-line patterns and an arrangement 4 carries out the opening perforation. The extrusion arrangements 5 and 7 coat plastic material onto the web 2 which is cooled and laminated by cooling and laminating cylinders 6 and 8. Furthermore, a rotating cutting arrangement 10 cuts the web into partial webs 11.

Figure 2:
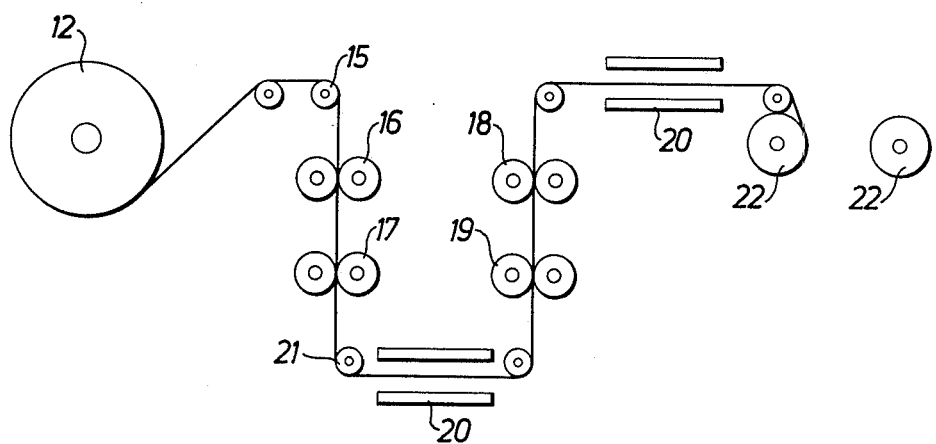
FIG. 2 is a schematic view of an apparatus for providing the partial webs which have been rolled up into magazine rolls with printed text and decorations and for rolling the webs into magazine rolls adapted to the packing machine.

In FIG. 2 the partial webs 11 are rolled up into large magazine rolls 14, and four printing mechanisms 16, 17, 18 and 19 print different colours. A drying arrangement 20 dries the web which is rolled on the finished packing material rolls 22.

In the manufacture of the packing material the process starts from a magazine roll 1 holding a rolled-up web 2 of paper or cardboard. The width of the web 2 is considerably greater than the width of the eventual packing material webs, and as a rule a multiple of the width of the finished packing material webs. The paper or cardboard web 2 is passed to a rotating creasing mechanism 3 comprising two co-operating rotatable tool cylinders, one of which cylinders has on its surface the intended crease-line pattern in raised relief, while corresponding crease-line patterns on the other tool cylinder consist of grooves or recesses. The web 2 passes between the tool cylinders where the raised pattern in the one cylinder will be pressed down into the material in corresponding grooves or recesses in the other cylinder, which impresses a crease-line pattern facilitating the fold-forming into the web 2. Since the web 2 has a width which is a multiple of the width of the finished packing material webs, each of which have a complete crease-line pattern, the crease tool 3 is the carrier of a number of impression devices, each comprising a complete crease-line pattern. After passing the creasing tool 3 the web 2 is conducted to a rotating punching or perforating tool 4 which performs the punching operation or perforation in register with the crease-line pattern. The perforation or punching is intended to constitute an opening indication for the packages manufactured from the packing material, and it is important therefore that the punching or creasing should be located correctly in relation to the impressed crease-line pattern. The punching may consist e.g. of a small hole intended for a suction pipe, or of a perforation which is intended to be torn off in connection with the opening of the finished package.

After the creasing and punching operations the web 2 is passed under the extruder 5, from which molten plastic material is extruded through a slotted die to form a thin film which is coated over the whole width of the web 2. With the help of cooling and pressing cylinders 6 the plastic layer applied is laminated so that it obtains good adhesion to the web 2. The web 2, which is now coated on one side with plastic material, is passed subsequently over a guide roller arrangement such that its uncoated side is conducted past a second extruder 7 which applies a second plastic layer to the web 2. The second plastic layer is stabilized and bonded to the web 2 with the help of the cooling and pressing cylinders 8. The processed web, which in the manner described above has been provided with plastic coatings on both sides, is passed over guide rollers 9 to a cutting mechanism 10 wherein the plastic-coated web 13 is divided up into a number of partial webs 11 by rotating knives 10. The partial webs 11 are rolled up into separate magazine and transport rolls 12.

The web 2 may be laminated with further layers, e.g. a metal foil layer, to improve imperviousness to gas. It is also possible to apply to the web a number of plastic layers placed on top of one another of different type or quality.

The magazine rolls 12, which contain plastic-coated, pre-creased material 13 provided with opening arrangement, are made relatively large as a rule and are intended to be transported to local processing units which in principle only carry out the printing of the material web. This printing with decoration and text, which is adapted to the requirements and purposes of the user of the packing material, can be done in a relatively simple and inexpensive and possibly slow-running printing presses (such a printing press is shown in FIG. 2).

The magazine roll 12 received at the said processing location of pre-creased and plastic-coated, but unprinted, packing material is printed by passing the web which is rolled off the magazine roll 12 over a guide roller 15 and is made to pass the printing mechanisms 16, 17, by which two different colours of the desired decoration are printed onto the web. Subsequently the web is passed over a guide roller 21, dried by a drying arrangement 20, whereupon continued printing with further colours is carried out by printing rollers 18 and 19. The finished web can be dried further in an arrangement 20 and rolled up subsequently into a magazine roll 22 whose size is adapted to the requirement of the packing machine.

By decentralizing the printing part of the packing material manufacture in the abovementioned manner, great benefits in production and administration can be achieved, in that in the first production location, where merely the crease-line impression, plastic coating etc, are carried out, the packing material can be processed in machines which operate at a very high web speed and therefore have a high capacity. Moreover, the packing material can be processed in very wide webs which further enhances the capacity. Since crease-line patterns, opening arrangement, etc, are more or less standardized, the high capacity manufacturing machines can operate without a break for a long time, since no change of decoration in the printing mechanism has to be carried out. An administrative advantage is that the central production location does not have to be burdened with keeping ready and planning of a large number of different decorations for various dairies etc, but can concentrate on the manufacture of unprinted packing materials. The packing materials subsequently are transported in large magazine rolls to local processing units which serve a smaller number of users of the packing material, and where only the printing of the packing material produced earlier is carried out.

Since the decoration printed onto the webs in general has to be adapted to the crease-line pattern, so that the decoration is located in the same place on all packages, it has been found appropriate at the first place of manufacture, that is to say onto the wide first web, to print guiding marks in register with the crease-line pattern. The guiding marks are arranged so that they can be picked up by photoelectric devices, for example, photocells, which guide the printing in the said processing units. Accordingly, the printed decorations and texts will be adapted to the crease-line pattern in the intended manner.

In certain cases, for example when the packing material which is manufactured is intended for small packages, the width of the individual packing material webs will be so small that even the partial webs which are manufactured at the first production location will comprise a number of non-separated webs arranged side by side, each having its crease-line pattern. In this case these partial webs, comprising several complete, parallel, crease-line patterns, can of course be printed in a joint printing operation and can be cut up subsequently into individual packing material webs, which are then rolled up into magazine rolls. A decisive factor on how wide the partial webs can be is of course the width of the printing cylinders on the available printing machines which should be used economically. In the manufacture of packing material webs for milk packages, for example, it has been found that on a certain available printing machine packing material webs for packages of 1 liter size can be printed advantageously on a partial web which has the width of a complete crease-line pattern, whereas on the other hand on the same printing machine packing material webs for packages of 2½ and 3 ml are so narrow that the partial web can contain two parallel complete crease-line patterns. Therefore on printing of the partial web obtained from the first production location two complete decorations situated side by side can be printed, and the partial web is then cut up in its longitudinal direction so as to form individual packing material webs which are rolled up into magazine rolls of suitable size. In other words, the magazine rolls comprise a certain definite number of complete decoration patterns.

The principles, preferred embodiment and mode of operation of the present invention have been described in the foregoing specification. However, the invention which is intended to be protected is not to be construed as limited to the particular embodiment disclosed. Variations and changes may be made by others without departing from the spirit of the present invention. Accordingly, it is expressly intended that all such variations and changes which fall within the spirit and scope of the present invention as defined in the appended claims be embraced thereby.

What is claimed:

1. A method for the manufacture of a packing material web, comprising the steps of providing a first web of a base layer material having a width which is a multiple of the width of said packing material web with a crease-line pattern for facilitating folding of said packing material web into packages, providing perforations adapted to form emptying openings on the packages manufactured from the packing material web, printing guiding marks consisting of markings printed in a dark color and adapted to be sensed by photoelectric arrangements onto said first web during the impression of the crease-line pattern, said guiding marks in number and in location being arranged such that each portion of the width of the first web that constitutes a single partial web receives corresponding guiding marks, coating said first web, after the crease-line pattern and perforations have been provided, on both sides with thermoplastic material, cutting the first web thus coated with thermoplastic material in a longitudinal direction to form a number of separate partial webs, each of the partial webs having a width corresponding to the width of at least one of the desired packing material webs, subsequently separately providing each of the partial webs in separate printing operations with decoration and text, controlling the printing operations by reference to the guiding marks, operating the printing operations at a substantially slower speed than the other operations, and rolling the printed webs into magazine rolls of a predetermined size.

2. The method in accordance with claim 1, further comprising rolling said partial webs after the cutting operation into relatively large magazine rolls intended for transport to the separate printing operations.

3. The method in accordance with claim 1, wherein the width of the partial webs is determined by the width of the corresponding crease-line patterns impressed onto the first web.

4. The method in accordance with claim 3, wherein the widths of the partial webs are different from one another.

5. The method in accordance with claim 1, wherein the printed partial webs consists of at least two material webs, each material web of the partial webs having the complete printing and crease-line pattern, and further comprising cutting the printed partial webs in a second cutting operation into individual webs, each individual web having the width of only one printing and crease-line pattern.

* * * * *